INVENTOR.
ALFRED H. SWAN
BY Lyon & Lyon
ATTORNEYS

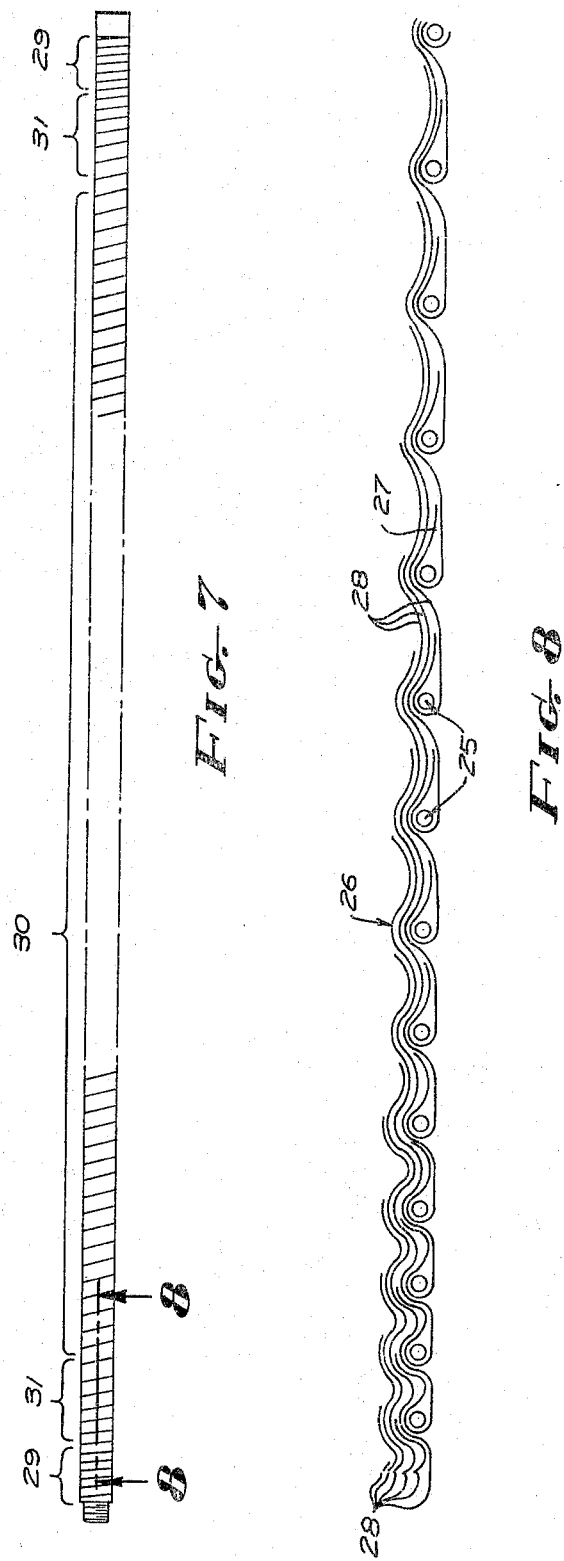

United States Patent Office 3,325,327
Patented June 13, 1967

3,325,327
METHOD AND APPARATUS FOR MAKING A HOSE OF HELICALLY WRAPPED REINFORCING AND WEB COMPONENTS
Alfred H. Swan, Newport Beach, Calif., assignor to Air Reduction Company, Incorporated, New York, N.Y., a corporation of New York
Filed Apr. 27, 1964, Ser. No. 362,618
8 Claims. (Cl. 156—143)

This invention relates to variable pitch hose, method and means of manufacture. Included in the objects of this invention are:

First, to provide a variable pitch plastic hose formed of helically wrapped wire and web components the pitch of which is varied to provide regions of greater or lesser flexibility and greater or lesser wall thickness, the hose otherwise being similar to the hose shown in Patent No. 2,740,427 issued Apr. 3, 1956, for Articulated Hose, or to other types of otherwise conventionally flexible plastic hose formed of helically wrapped components.

Second, to provide a method and means of manufacturing plastic hose wherein wire or web components are wrapped about a cylindrical mandrel divided into a cage of axially movable segments, each of which is moved axially forward during a major portion of revolution of the mandrel and returns quickly to an initial position at intervals, there being, at any given instant of rotation, a majority of the segments undergoing a forward movement to effect forward and helical progression of the hose components.

Third, to provide a method and means of manufacturing plastic hose wherein the rate of forward movement of the mandrel segments may be varied while the mandrel is rotating thereby to vary the pitch of the hose components being wrapped on the mandrel.

With the above and other objects in view as may appear hereinafter reference is directed to the accompanying drawings, in which.

Figure 2:
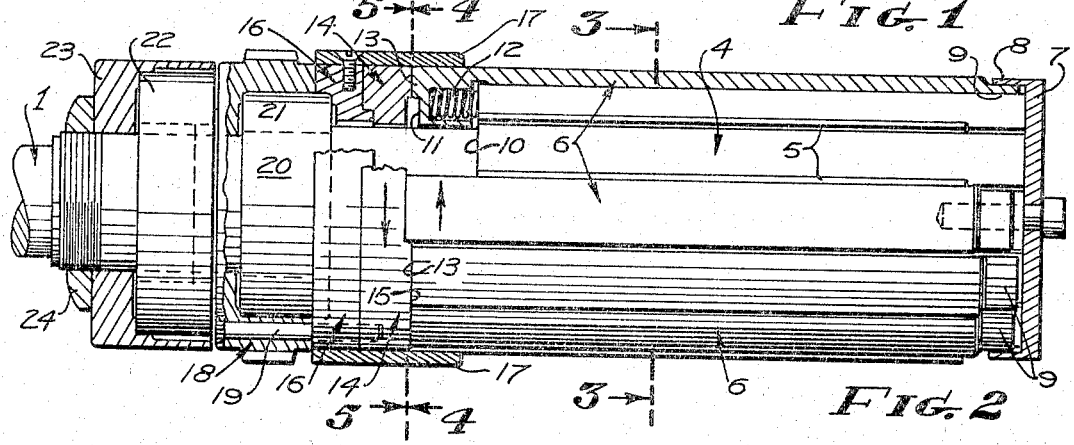
FIGURE 2 is an enlarged fragmentary view thereof with portions in longitudinal section.
Figure 4:
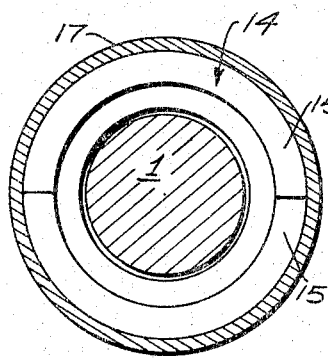
Figure 5:
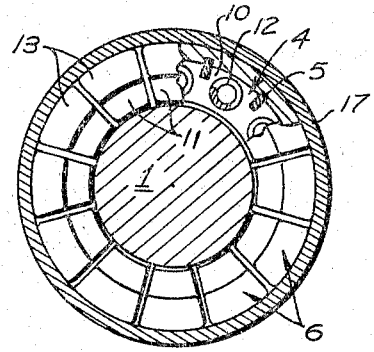
Figure 3:
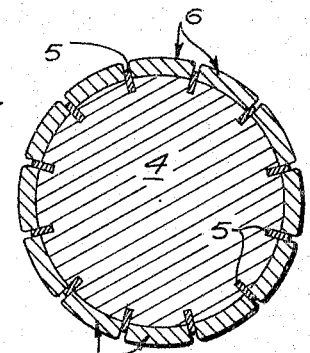

FIGURES 3, 4 and 5 are transverse sectional views taken through 3—3, 4—4 and 5—5 respectively of FIGURE 2.

Figure 1:
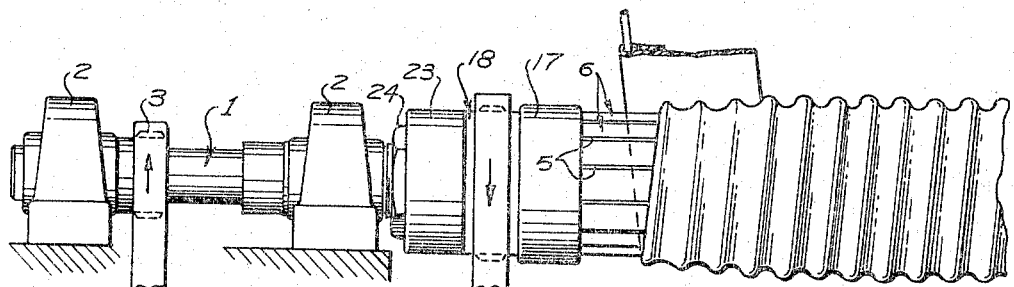
FIGURE 1 is a side view of the means for manufacturing plastic hose having a variable pitch, showing a hose being formed thereon.
Figure 6:
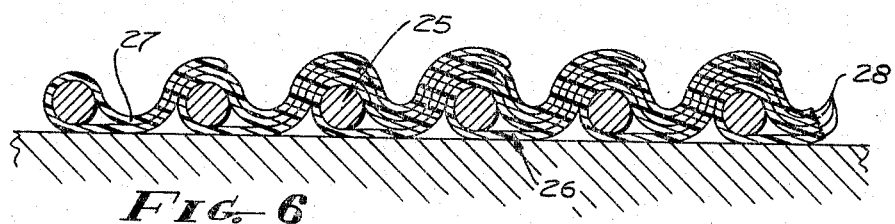

FIGURE 6 is an enlarged fragmentary sectional view taken through 6—6 of FIGURE 1 showing the initial few turns of a hose being formed.

FIGURE 7 is an essentially diagrammatical view of a hose having variable pitched end portions.

FIGURE 8 is a fragmentary diagrammatical sectional view thereof taken through 8—8 of FIGURE 7.

The means for manufacturing variable pitch hose includes a mandrel drive shaft 1 supported by spaced bearings 2 and driven by a drive sprocket 3 in such a manner that the rate of rotation may be accurately controlled. Mounted on the extended end of the drive shaft 1 is a mandrel 4 which is cylindrical and provided with a set of longitudinally extending narrow ribs 5.

Slideably mounted between the ribs 5 is a cage of mandrel segments 6 which, collectively, present a cylindrical surface. The extremity of the mandrel 4 receives a cap 7 having a cylindrical rim 8 overlying the mandrel. The extremities of the mandrel segments are reduced in radial thickness as indicated by 9 so as to slide within the rim 8 and be retained thereby against radial displacement. The diameter of the cap 7 is slightly smaller than the normal diameter of the cylinder formed by the mandrel segments.

The mandrel 4 defines at its rearward end an annular shoulder 10 and each mandrel segment is provided with a radially inwardly directed lug 11 which overlies and confronts the shoulder 10. The lug 11 and the shoulder 10 are provided with aligned sockets which receive springs 12 to urge the mandrel segments 6 rearwardly with respect to the mandrel 4.

The rearward extremities of the mandrel segments form cam-engaging faces 13. A cam ring 14 is disposed rearwardly of the mandrel segments and is provided with one or more axially facing helical cams 15. In the construction illustrated two semicircular helical cams are shown. The cam ring 14 is supported by a mounting ring 16 to which is attached a sleeve 17 which extends forward over the cam ring 14 and over the rearward portions of the mandrel segments 6 to restrain the mandrel segments against radial displacement.

The mounting ring 16 is attached to a drive sprocket 18 by means of axially extending screws 19. The mounting ring 16 and drive sprocket 18 define internally a chamber which receives a bearing 20 carried by the mandrel drive shaft 1 so as to support the drive sprocket, mounting ring and cam ring in concentric relation with the drive shaft and mandrel. The rearward side of the drive sprocket 18 is provided with an internal flange 21 which supports a thrust bearing 22 engaged by a collar 23 which is axially adjustable on the mandrel drive shaft 1 by means of a nut 24. The drive sprocket provides a means for accurately timing the rotation of the cam ring 14.

A typical hose adapted to be manufactured by the hereinbefore described means is illustrated in FIGURES 6, 7 and 8. The hose includes a helical wrapped reinforcing wire 25 covered by a web 26 of plastic material one margin of which is folded as indicated by 27 to encase the reinforcing wire. The width of the web 26 overlies several convolutions of the reinforcing wire so as to form a plurality of laminations 28. To this extent, the hose may be essentially the same as the hose disclosed in the aforementioned Patent No. 2,740,427.

The present hose differs, however, in that the pitch of the helically wrapped reinforcing wire and web is not constant but vary the characteristics of the hose where desired. Thus, as shown in FIGURE 7 the extremities of the hose are provided with portions 29 of narrow pitch which are joined to a central portion 30 of wide pitch by transition portions 31, the pitch of which gradually changes. The effect of this is to increase the strength and reduce the flexibility of the hose and its extremities.

The method of manufacturing the variable pitch hose is as follows: the mandrel 4 and its mandrel segments 6 are rotated in one direction and the cam ring 14 is rotated in the opposite direction at precisely related speeds. The mandrel segments 6 are moved axially forward on the mandrel and as they rotate describe a helical path by reason of engagement with the helical cams 15 and as each mandrel segment clears the extremity of the helical cam it is snapped rearwardly by its spring 12 on to the axially rearward portion of the following helical cam. Thus, at any instant of rotation, the majority of the mandrel segments 6 are moving forward. At other instances all but two of the twelve mandrel segments illustrated are moving forward.

The manufacture of the hose is initiated by hand wrapping the hose components about the mandrel segments 6 in several convolutions so as to provide gripping engagement. The mandrel and its segments and the cam ring are rotated in opposite directions at predetermined relative speeds causing the mandrel segments to advance in a selected helical path. Inasmuch as the frictional grip between the hose components and the mandrel segments is equally distributed over all of the segments, a minority of the segments may be moved rearward without affecting forward helical progress of the hose components.

In the manufacture of the variable pitch hose the relative speeds of the mandrel and cam ring may be initially operated to produce a hose section of the selected minimum pitch, then the relative speeds may be gradually changed to progressively increase the pitch until a selected maximum pitch is reached whereupon the body of the hose may be wound and then the process is reversed to produce the final end of the hose.

It should be noted that while a hose of varying pitch may be manufactured, that a hose of constant pitch may likewise be manufactured. If a light duty hose is desired which has few laminations a wide pitch is selected. Whereas, if a heavy duty hose of increased laminations a narrow pitch is selected. This is accomplished merely by changing the relative speed of the mandrel and the cam ring.

It will be observed that the axial travel of the mandrel segments need not be great. For example, if the two cam steps are 0.50 inch each and the ratio of rotation of the mandrel and the cam is one to four, a half-inch pitch is produced. If this ratio is changed to one to six and one-half, a three-fourths inch pitch is produced. It should be further observed that the mandrel and cam ring are preferably rotated in opposite directions to increase the relative speed while reducing the absolute speed of rotation. However, the same result may be obtained with the mandrel and cam ring rotated in the same direction and the mandrel traveling faster or slower than the cam providing that the pitch of the cam ring is in the proper direction.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A method of forming a hose of helically wrapped reinforcing and web components, characterized by:
    (a) rotation a mandrel to wrap said components thereabout said mandrel comprising a plurality of longitudinally extending, relatively movable surface segments on which said components are wound,
    (b) simultaneously moving axially forward segments comprising the major surface of said mandrel to advance said hose components into helical paths while retracting segments comprising the remaining surface of said mandrel for subsequent forward movement.

2. A method of forming a hose of helically wrapped reinforcing and web components, characterized by:
    (a) rotating a mandrel to wrap said components thereabout, said mandrel comprising a plurality of longitudinally extending, relatively moveable surface segments on which said components are wound,
    (b) simultaneously moving axially forward segments comprising the major surface of said mandrel to advance said hose components into helical paths while retracting segments comprising the remaining surface of said mandrel for subsequent forward movement;
    (c) and varying the frequency of forward movement of said major surface during revolution of said mandrel to vary the pitch of said hose components.

3. Means for manufacturing flexible plastic hose of the type wherein the components are in the form of helical wrappings, said means comprising:
    (a) a rotatable cylindrical mandrel having a free end;
    (b) a cage of axially slidable mandrel segments mounted on and covering said mandrel, said segments adapted, on rotation of said mandrel, to cause said components to wrap thereabout;
    (c) helical cam means axially engageable with a majority of said mandrel segments simultaneously to move said segments in a helical path forwardly toward the free end of said mandrel as said mandrel rotates;
    (d) and means for retracting a minority of said segments simultaneously with forward movement of the majority of said segments for subsequent engagement by said cam means, whereby said wrappings tend to advance helically with the advancing mandrel segments.

4. Means for manufacturing flexible plastic hose of the type wherein the components are in the form of helical wrappings, said means comprising:
    (a) a cage of mandrel segments defining a cylindrical surface;
    (b) means for rotating said segments about a common axis to cause said hose components to wrap thereon;
    (c) means for advancing each mandrel segment axially during the major portion of its rotation about said axis, to cause each segment and the wrapping thereon to describe a helical path;
    (d) and means for rapidly retracting each mandrel segment during a minor portion of its rotation such that the majority of said mandrel segments at any instant of rotation are advancing and a minority are retracting, and a progressive helical movement is imparted to said wrappings.

5. Means for manufacturing flexible plastic hose of the type wherein the components are in the form of helical wrappings, said means comprising:
    (a) a cage of mandrel segments defining a cylindrical surface;
    (b) means for rotating said segments about a common axis to cause said hose components to wrap thereon;
    (c) means for advancing each mandrel segment axially during the major portion of its rotation about said axis, to cause each segment and the wrapping thereon to describe a helical path;
    (d) means for rapidly retracting each mandrel segment during a minor portion of its rotation such that the majority of said mandrel segments at any instant of rotation are advancing and a minority are retracting, and a progressive helical movement is imparted to said wrappings;
    (e) and means for variably rotating said advancing means with respect to the rotation of said mandrel segments to vary the rate of forward advance thereof, thereby to vary the pitch of said helical path.

6. Means for manufacturing flexible plastic hose of the type wherein the components are in the form of helical wrappings, said means comprising:
    (a) a rotatable cylindrical mandrel having a free end;
    (b) a cage of axially slidable mandrel segments mounted on and covering said mandrel said segments adapted to cause said components to wrap thereabout;
    (c) helical cam means axially engageable with a majority of said mandrel segments simultaneously to move said segments and the wrappings thereon to move in a helical path forwardly toward the free end of said mandrel as said mandrel rotates;
    (d) means for causing a minority of said segments to retract simultaneously with forward movement of the majority of said segments for subsequent engagement by said cam means, whereby said wrappings tend to advance helically with the advancing mandrel segments;
    (e) and means for variably rotating said cam means with respect to the rotation of said mandrel segments to vary the rate of forward advance thereof, thereby to vary the pitch of said helical path.

7. Means for manufacturing flexible hose of the type wherein the components are in the form of helical wrappings, said means comprising:

(a) a cylindrical mandrel having a free end;
(b) a shaft and bearings rotatably supporting said mandrel;
(c) an annular helical cam means journalled at the end of said mandrel remote from its free end to move axially forward with respect to said mandrel;
(d) means for rotating said cam means with respect to said mandrel to vary the rate of relative forward movement;
(e) a plurality of axially movable mandrel segments enveloping said mandrel and engageable by said cam means to describe helical paths, said cam means being contoured to permit retraction of a minority of said mandrel segments during selected intervals of rotation about said mandrel, whereby at any instant, a majority of said mandrel segments are moving forwardly;
(f) said mandrel segments adapted to be wrapped by said hose components, and tending to advance said components helically at a selected pitch.

8. The method of manufacturing a hose by helically winding an elongated hose-forming strip in overlapping helical convolutions comprising:

(a) winding said hose-forming strip on a plurality of longitudinal supporting members forming a longitudinally extending surface receiving a plurality of convolutions of said windings,
(b) causing said wound convolutions to grip said supporting elements around the winding surface formed thereby, and
(c) advancing some of said supporting elements while retracting others thereof so that the major portion of the winding surface formed by said elements is advanced in the direction of winding and said strip is wound in helical convolutions and advanced in the direction of winding on said supporting members.

References Cited
UNITED STATES PATENTS

| | | | |
|---|---|---|---|
| 2,740,427 | 4/1956 | Swan | 138—122 |
| 3,144,072 | 8/1964 | Karbowiak | 156—173 X |
| 3,155,559 | 11/1964 | Hall | 156—195 |

EARL M. BERGERT, Primary *Examiner*.

PHILIP DIER, *Examiner*.